United States Patent [19]

Kawakami et al.

[11] Patent Number: 4,801,106
[45] Date of Patent: Jan. 31, 1989

[54] COIL OF TAPERED WIRE

[75] Inventors: Heijiro Kawakami; Yasunobu Kawaguchi; Kozo Katsube; Mamoru Murahashi; Susumu Takada, all of Kobe, Japan

[73] Assignee: Kabushiki Kaisha Kobe Seiko Sho, Kobe, Japan

[21] Appl. No.: 74,030

[22] Filed: Jul. 16, 1987

[30] Foreign Application Priority Data

Nov. 4, 1986 [JP] Japan .................................. 61-262490

[51] Int. Cl.⁴ ........................................... B65H 55/00
[52] U.S. Cl. .................................................. 242/159
[58] Field of Search ............... 242/159, 174, 176, 177, 242/178, 1; 140/71 R, 71 C, 147; 267/60, 61 R, 166, 180; 72/127, 135, 138, 146, 142

[56] References Cited

U.S. PATENT DOCUMENTS

| | | |
|---|---|---|
| 1,862,992 | 6/1932 | Vargha . |
| 3,231,217 | 1/1966 | Justice, Jr. ........................ 242/159 |
| 3,470,861 | 10/1969 | Grandy ........................... 242/159 X |
| 3,700,185 | 10/1972 | Hubbard et al. ..................... 242/159 |
| 4,261,191 | 4/1981 | Suzuki et al. .................... 242/159 X |

FOREIGN PATENT DOCUMENTS

| | | |
|---|---|---|
| 56416 | 4/1985 | Japan . |
| 56417 | 4/1985 | Japan . |
| 682135 | 11/1952 | United Kingdom . |

Primary Examiner—Stanley N. Gilreath
Attorney, Agent, or Firm—Oblon, Fisher, Spivak, McClelland & Maier

[57] ABSTRACT

A coil of tapered wire for forming coil springs, formed by winding substantially in concentric loops a quench-hardened and tempered tapered wire having a successive arrangement of tapered wire segments each consisting of a thick section, two thin sections and two tapered sections connecting the thin sections to the opposite ends of the thick section, respectively. The tapered wire is subjected to a preforming action immediately before being wound in loops on a winding drum, to form plastic bends in the thick sections and plastic bends of a radius of curvature greater than that of the plastic bends in the thick sections so that the tapered wire is wound in substantially uniform, concentric circular loops on a winding drum. When the tapered wire is unwound from the coil and is subjected to a straightening process of a fixed straightening arrangement of a series of straightener rollers before being coiled in tapered wire coil springs on a coil spring forming mill, the thick sections undergo a straightening action greater than that acts on the thin sections, so that which the tapered wire unwound from the coil of tapered wire is straightened in a substantially straight tapered wire and thereby the tapered wire is coiled in tapered wire coil springs having a correct size and a uniform shape.

2 Claims, 5 Drawing Sheets

FIGURE 6 (1)
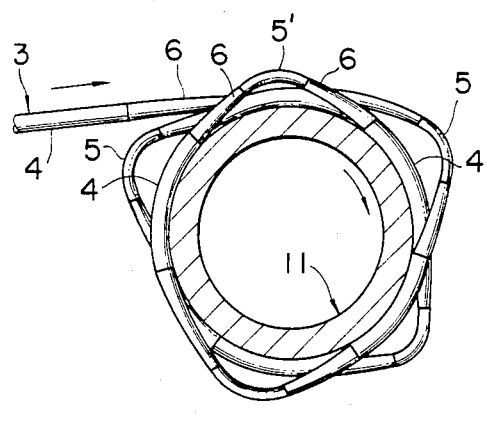
FIGURE 6 (2)
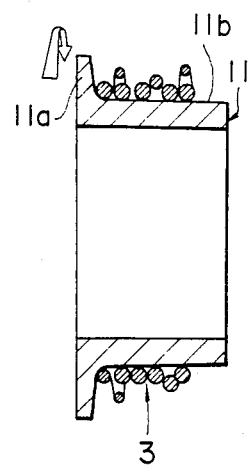
FIGURE 7
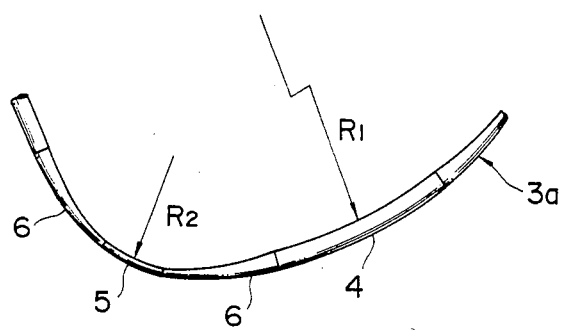

COIL OF TAPERED WIRE

BACKGROUND OF THE INVENTION

1. Field of the Invention

The present invention relates to a coil of tapered wire for forming a coil spring, formed by coiling a tapered wire continuously varying in section in substantially concentric loops

2. Description of the Prior Art

Generally, the conventional coil spring is formed by coiling a wire having a fixed diameter through a cold working as illustrated in FIGS. 3(1) and 3(2). A coil 21 formed by coiling a wire 25 having a fixed section substantially in concentric loops is mounted on a turn table 22. The wire 25 is pulled out from the coil 21 through a straightening unit 26 by the feed rollers 24 of a spring forming machine 23. The straightening unit 26 has an alternate arrangement of three fixed straightener rollers 26a and two movable straightener rollers 26b. The wire 25 is straightened by the straightening unit 26 so as to extend in a straight line in an unrestrained condition. The straightened wire 25a is subjected to the coiling action of coiling members 27 for cold coiling. The coiling members 27 need not necessarily be rolling members as shown in FIGS. 3(1) and 3(2), but may instead be fixed dies. The degree of straightening action of the straightening unit 26 is regulated by varying the disposition of the two movable rollers 26b relative to the three fixed straightener rollers 26a. The respective number of the straightener rollers 26a and 26b need not necessarily be three and two, but may be optional numbers.

In recent years, a coil spring continuously varying in section as shown in FIG. 4, namely, a tapered wire coil spring 1 having nonlinear spring characteristics has progressively become used instead of a coil spring having a fixed section, to improve the riding comfort and to reduce the weight of automobiles and railway vehicles.

Such a tapered wire coil spring 1 is formed by coiling a tapered wire 3 having a thick section 4, thin end sections 5 and 5', and tapered sections 6 connecting the thin end sections 5 and 5' to opposite ends of the thick section 4, respectively, as shown in FIG. 5. The diameter $d_2$ of the thin end section 5 and the diameter $d_3$ can be either $d_2=d_3$ or $d_2 \neq d_3$. In the following description, the thin end sections 5 and 5' will be denoted inclusively by a reference numeral 5.

Generally, the tapered wire 3 is manufactured by using a swaging machine capable of high-speed forging or a peeling machine capable of high-speed peeling. The applicant of the present invention proposed previously a highly productive tapered wire manufacturing process in Japanese Patent Provisional Publication Nos. 60-56416 and 60-56417.

In this tapered wire manufacturing process, a metallic material is fed at a fixed feeding speed into a heating furnace for softening, then the softened metallic wire is cooled, and the cooled metallic wire is then drawn at a regularly variable drawing speed so that the sectional area of the softened and cooled metallic wire is varied continuously to form a tapered wire 3. The tapered wire 3 is wound in a coil before being supplied to a spring forming machine 23.

However, problems arise in winding the tapered wire 3 in a coil. Since the thin end sections 5 are smaller than the thick section 4 in section, the thin end sections 5 are subject to plastic strain, so that the thin end sections 5 are liable to be bent sharply as shown in FIGS. 6(1) and 6(2) when the tapered wire 3 is wound in a coil. Therefore, the tapered wire 3 thus wound in a coil assumes as unrestrained tapered wire 3a as shown in FIG. 7 in an unrestrained state. That is, the unrestrained tapered wire 3a has thin end sections 5 greater in plastic bending characteristic than the thick section 4, namely, $R_1 > R_2$, where $R_1$ is the radius of curvature of the thick section 4 and $R_2$ is the radius of curvature of the thin end sections 5. A coiled wire having a uniform section is uniform in plastic bending characteristic in an unrestrained state. The degree of plastic bending is dependent on the limit of elasticity and diameter of the wire, the diameter of the winding drum and the magnitude of back tension irrespective of the position on the wire.

To form a coil of the tapered wire 3a having plastic bends as shown in FIG. 7, the tapered wire 3a needs to be straightened by the straightening unit 26 in a manner as described with reference to FIGS. 3(1) and 3(2) before coiling. However, the horizontal distance, the distance in a direction perpendicular to the sheet in FIG. 3(2), between the fixed straightener rollers 26a and the movable straightener rollers 26b is unavoidably fixed and hence the straightening action of the straightening unit 26 on the thick section 4 is more intensive than that on the thin section 5. Therefore, the thin section 5 cannot be straightened satisfactorily.

FIGS. 8(1) and 8(2) show modes of straightening operation of the straightening unit 26 with the fixed straightener rollers 26a and the movable straightener rollers 26b set in a fixed straightening arrangement, namely, with the center distance $C_1$ between the fixed straightener rollers 26a and the movable straightener rollers 26b for straightening a thicker wire 28a (FIG. 8(1)) and the center distance $C_2$ between the fixed straightener rollers 26a and the movable straightener rollers 26b for straightening a thinner wire 28b (FIG. 8(2)) equal to each other. As is obvious from FIGS. 8(1) and 8(2), such an arrangement of the fixed straightener rollers 26a and the movable straightener rollers 26b is effective for straightening the thicker wire 28a, however, the same is unable to straighten the thinner wire 28b satisfactorily.

When a tapered wire 3 thus unsatisfactorily straightened on a straightening machine with the straightening rollers set in a fixed straightening arrangement is subjected to a coil spring forming process, the plastic bending of the thin sections of the tapered wire 3 remains almost the same as in forming a tapered wire coil spring 1' having an irregular form as shown in FIG. 9.

It is possible to straighten such as tapered wire satisfactorily by automatically regulating the straightening arrangement of the straightener rollers according to the variable diameter of the tapered wire and the degree of bends in the tapered wire. However, such a straightening process needs a sophisticated control system including a detecting unit for detecting the continuously variable diameter and bends of the tapered wire and a control unit capable of continuously controlling the straightening arrangement of the straightener rollers on the basis of information provided by the detecting unit. Accordingly, such a straightening process, in practice, is not readily feasible.

It is also possible to form a uniform tapered wire coil spring by continuously controlling the coil forming rollers so as to move radially of the tapered wire coil spring in winding a tapered wire having plastic bending in the thin sections 5. However, this process, similarly to the former process, needs a sophisticated control system and hence is not readily feasible.

Therefore, according to the technical status quo, straight tapered wire 3 having a fixed length is subjected to a coil spring forming process, and hence coil springs cannot be formed, thus continuously deteriorating the efficiency of the coil spring manufacturing process.

SUMMARY OF THE INVENTION

Accordingly, it is an object of the present invention to provide a coil of tapered wire which enables winding a tapered wire coil spring of normal size and shape without requiring the modification of the straightening unit and the coil spring forming machine.

To achieve the object of the invention, the present invention provides a coil of tapered wire, formed by winding substantially in concentric loops a tapered wire 3 having a successive arrangement of tapered wire segments 3b each consisting of a thick section 4, thin sections 5 and tapered sections 6 connecting the thin sections 5 to the opposite ends of the thick section 4, respectively, characterized in that the radius $R_1$ of curvature of respective plastic bends in the thick sections 4 in an unrestrained state is smaller than the radius $R_2$ of curvature of respective plastic bends in the thin sections 5 in an unrestrained state.

Since the unrestrained plastic deformation of the thick sections 4 is greater than that of the thin sections 5, namely, since the radius $R_1$ of curvature of the thick sections 4 is smaller than the radius $R_2$ of curvature of the thin sections 5 in an unrestrained state, the tapered wire 3 can be straightened satisfactorily even if the tapered wire 3 is straightened on a straightening machine with a fixed straightening arrangement, because the straightening action of the straightener rollers on the thick sections 4 is more intensive than on the thin sections 5.

BRIEF DESCRIPTION OF THE DRAWINGS

The above and other objects, features and advantages of the present invention will become more apparent from the following description taken in conjunction with the accompanying drawings, in which:

FIG. 3(2) is a side elevation of the coil spring forming mill of FIG. 3(1);

FIG. 6(1) is a cross-sectional view of a wire winding drum on which a tapered wire is wound without forming plastic bends in the thick sections thereof;

FIG. 6(2) is a longitudinal sectional view of the wire winding drum of FIG. 6(1);

FIG. 7 is an illustration of a tapered wire in an unrestrained state after wound on a wire winding drum without forming plastic bends in the thick sections of the tapered wire;

DESCRIPTION OF THE PREFERRED EMBODIMENT

A coil of tapered wire, in a preferred embodiment, according to the present invention will be described hereinafter in terms of a wire winding apparatus for winding a tapered wire in such a coil of tapered wire.

Figure 1:
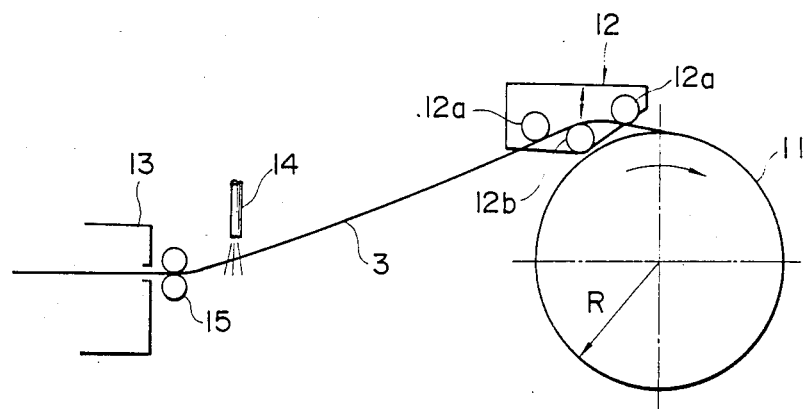
FIG. 1 is a schematic side elevation of a wire winding equipment, by way of example, for carrying out the present invention.

Referring to FIG. 1, a wire winding apparatus has a winding drum 11 and a preforming unit 12 disposed before the winding drum 11. The preforming unit 12 comprises two fixed rollers 12a and a movable roller 12b movable relative to the fixed rollers 12a. The degree of preforming action of the preforming unit 12 is dependent on the relative disposition of the fixed rollers 12a and the movable rollers 12b. Naturally, the number of the rollers of the preforming unit 12 need not be limited to three, and any preforming unit of suitable constitution may be employed.

Indicated at 13 is a tempering furnace for continuously tempering a tapered wire manufactured by a process disclosed in the previously cited Japanese Patent Application No. 60-56416 or 60-56417, at 14 is a cooling nozzle and at 15 are feed rollers. Since the tapered wire manufactured through the manufacturing process of the cited Japanese Patent Application No. 60-56416 or 60-56417 is quenched, the tapered wire is tempered by the tempering furnace 13 to provide a tempered tapered wire. Although an untempered tapered wire manufactured on a swaging machine or a peeling machine can be wound in a coil by the wire winding apparatus of FIG. 1, it is more advantageous, from the viewpoint of manufacturing facility, to quench-harden and temper the tapered wire before winding than to quench-harden and temper the tapered wire after forming the same in a tapered wire coil spring. That is, when a tapered wire coil spring is subjected to hardening and tempering processes, the tempered wire coil spring is liable to be strained and deformed and requires a great deal of work for correcting the deformation.

Figure 8:
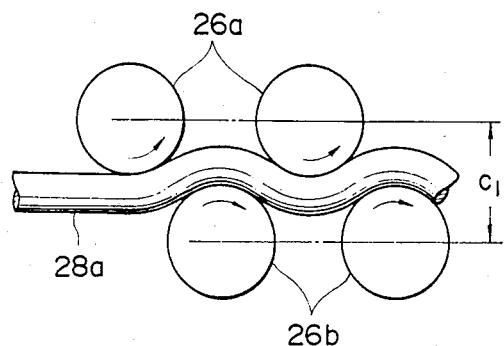
FIGS. 8(1) and 8(2) are schematic views of assistance in explaining respective modes of straightening a thicker wire and a thinner wire, respectively, under the same straightening arrangement of straightener rollers.
Figure 8:
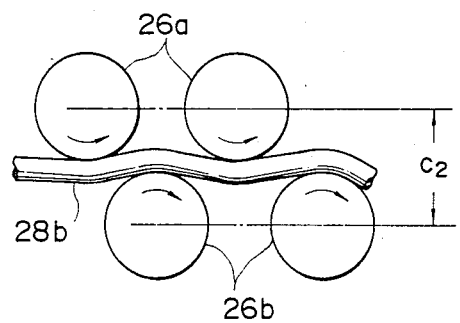
Figure 9:
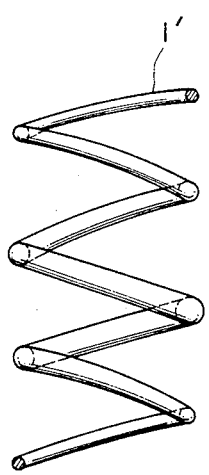
FIG. 9 is a schematic view of an abnormal tapered wire coil spring formed by coiling the tapered wire shown in FIG. 7.

The tapered wire 3 delivered from the tempering furnace 13 is fed after being cooled to the preforming unit 12. Then, the tapered wire 3 travels along a curved path formed between the fixed rollers 12a and the movable roller 12b. Then, the tapered wire 3 is pulled by and wound up on the winding drum 11. The fixed rollers 12a and movable roller 12b of the preforming unit 12 are arranged so as to form a plastic bend (plastic deformation) of a fixed radius of curvature in each thick section 4 of the tapered wire 3. Although dependent on the relation between the thick section 4 and the thin section 5 in diameter, a preferable radius of curvature of the plastic bend in the thick section 4, in general, is in the range of one to fifteen times the radius R of the winding drum 11 for winding the tapered wire 3 without forming such plastic bends as shown in FIGS. 6(1) and 6(2) in the thin sections 5. For the reasons explained with reference to FIGS. 8(1) and 8(2), the degree of plastic deformation of the thin sections 5 is less than that of the thick sections 4.

The winding drum 11 is the same in construction as the conventional winding drum shown in FIGS. 6(1) and 6(2); the winding drum 11 comprises a tapered cylinder 11b and a flange 11a formed at one end of the tapered cylinder 11b. The tapered wire 3 provided large plastic bends in the thick sections 4 thereof is wound around the tapered cylinder 11b from a position near the flange 11a toward the free end of the tapered cylinder 11b, so that the loops of the tapered wire 3 slide successively toward the tapered free end of the tapered cylinder 11b. When the tapered cylinder 11b is wound fully with the tapered wire 3, loops of the tapered wire 3 are bundled in a coil of tapered wire, and then the coil of tapered wire is removed from the winding drum 11 through the free end of the tapered cylinder 11b. Ordinarily, the diameter of the winding drum 11 for winding a tapered wire 3 having thick sections 4 of a diameter in the range of 10 to 15 mm is in the range of 1.5 to 2.0 m. The winding drum need not be of a horizontal type in which the coil of tapered wire is removed from the winding drum 11 in the horizontal direction, but may be of a vertical type in which the coil of tapered wire is removed from the winding drum in a vertical direction, namely, either upward or downward.

Figure 2:
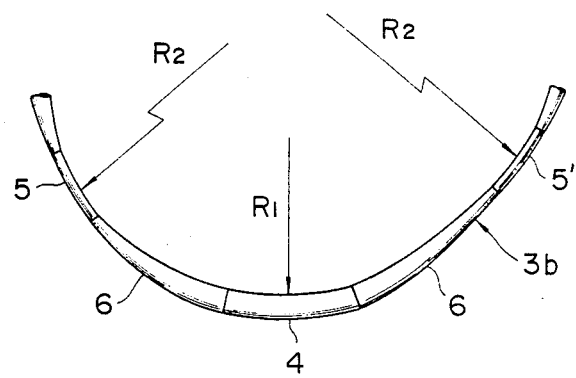
FIG. 2 is a fragmentary view of a tapered wire wound in a coil according to the present invention, showing the morphology of the tapered wire in an unrestrained state.
Figure 3:
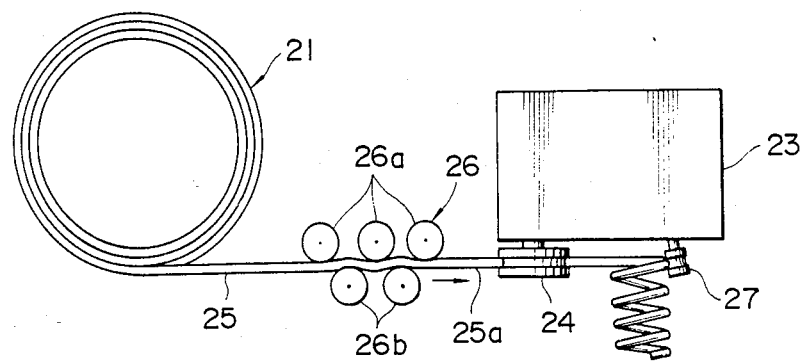
FIG. 3(1) is a plan view of a coil spring forming mill.
Figure 3:
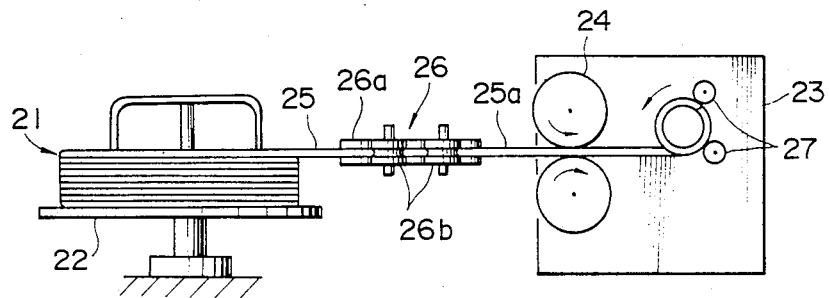
Figure 4:
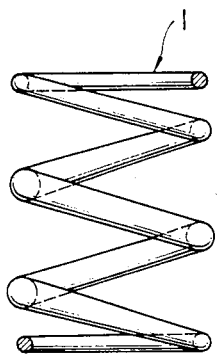
FIG. 4 is a side elevation of a normal tapered wire coil spring.

Referring to FIG. 2, when unwound from the coil of tapered wire of the present invention and left unrestrained, the tapered wire 3 assumes the morphology of an unrestrained tapered wire 3b having thick sections 4 each having a plastic bend of a radius $R_1$ of curvature smaller than the radius $R_2$ of curvature of the plastic bends in the thin sections 5. When this tapered wire 3 is straightened on the straightening unit 26 of a coil spring forming mill, the tapered wire 3 is straightened substantially in a straight shape by straightening only the plastic bends in the thick sections 4, because the straightening action of the straightening unit 26 on the thick sections 4 is more intensive than that on the thin sections 5 and, originally, only small plastic bends are formed in the thin sections 5.

Basically, although $R_1 < R_2$, the tapered wire 3 cannot be wound in circular loops on the winding drum 11 when $R_1$ is excessively small. Therefore, as mentioned above, a preferable value of $R_1$ is in the range of one to fifteen times the radius of the winding drum 11.

Thus, the tapered wire wound in a coil of tapered wire according to the present invention can be straightened substantially in a straight tapered wire by the straightening unit 26 provided at the front stage of the coil spring forming machine 23, whereby the tapered wire can be coiled easily in a tapered wire coil spring having satisfactory size and shape.

EXAMPLES

Specific examples of the coil of tapered wire will be described hereinafter.

Figure 5:
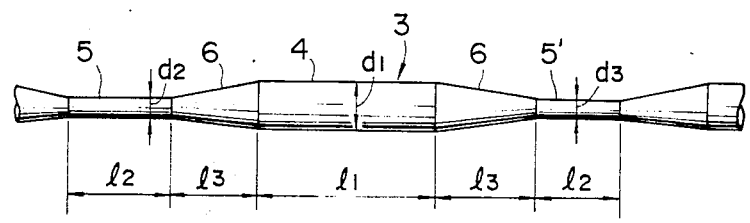
FIG. 5 is a fragmentary side elevation of a tapered wire.

(1) Sample Tapered Wire (FIG. 5):

Quality: SAE 9254 (C: 0.55 wt%, Si: 1.43 wt%, Cr: 0.66%)

Tensile strength (TS): 180 kg/mm$^2$

Dimensions: $d_1 = 14$ mm, $d_2 = d_3 = 11$ mm, $l_1 = 1000$ mm, $l_2 = 200$ mm, $l_3 = 600$ mm The oil-tempered sample tapered wire was passed through the preforming unit 12 and wound on the winding drum 11 of 1.5 m in diameter. The arrangement of the fixed rollers 12a and the movable rollers was varied to provide several sample coils of tapered wire differing from each other in plastic bends in the tapered wire.

(2) Tapered wires each having several tapered wire segments each consisting of the thick section 4, the thin sections 5 and the tapered sections 6 were sampled from the sample coil of tapered wire, and then the radius $R_1$ of curvature of the thick sections 4 and the radius $R_2$ of curvature of the thin sections 5 were measured in an unrestrained state. The measured results are tabulated in Table 1. Sample tapered wire No. 1 was wound on the winding drum 11 without subjecting to the preforming action of the preforming unit 12. Sample tapered wires No. 1 and 2 have plastic bends in the thin sections 5. Sample tapered wires No. 3 and 4 were sampled from sample coils of tapered wire according to the present invention; these tapered wires do not have any plastic bends in the thin sections 5.

TABLE 1

|  | Sample Nos. | | | | |
| --- | --- | --- | --- | --- | --- |
|  | 1 | 2 | 3 | 4 | 5 |
| $R_1$ (m) | 81 | 45 | 9 | 3 | 1 |
| $R_2$ (m) | 0.4 | 1.2 | 13 | 5 | 1.5 |

(3) Ten pieces of sample tapered wires of each of the sample Nos. 1 to 5 were coiled on a coil spring forming mill to form cylindrical tapered wire coil springs of 115 mm in target diameter and 300 mm in target height. The sample tapered wires were straightened by the straightening unit 26 so that at least the thick sections are straightened.

(4) The respective heights of the sample tapered coil springs respectively formed of the sample tapered wires of sample Nos. 1 to 5 were measured to determine the dimensional accuracy on the basis of the variation of the measured heights represented by the difference between the maximum height and the minimum height of the ten sample tapered wire coil springs of each sample group.

TABLE 2

|  | Sample Nos. | | | | |
| --- | --- | --- | --- | --- | --- |
|  | 1 | 2 | 3 | 4 | 5 |
| Variation (mm) | 16 | 11 | 5 | 4 | 6 |

(5) As is obvious from Table 2, the dimensional variation of the tapered wire coil springs formed of the tapered wires unwound from the coils of tapered wire according to the present invention is smaller than that of the rest of the tapered wire coil springs, from which it was confirmed that the coil of tapered wire of the present invention enables forming tapered wire coil springs of satisfactory quality.

Thus, the coil of tapered wire according to the present invention can be formed simply by forming plastic bends of a radius of curvature smaller than that of plastic bends in the thin sections in the thick sections of tapered wire, and the tapered wire unwound from the coil of tapered wire can be straightened satisfactorily even if only the thick sections are subjected to high straightening action of the straightener rollers. Consequently, the coil of tapered wire according to the present invention enables continuous and highly efficient manufacture of tapered wire coil springs.

Although the present invention has been described in its preferred form with a certain degree of particularity, it is to be under stood to those skilled in the art that many changes and variations are possible in the invention without departing from the scope and spirit thereof.

What is claimed is:

1. A coil of tapered wire, comprising:
a plurality of concentric loops of tapered wire having a successive arrangement of tapered wire segments each consisting of a bent thick section having a radius of curvature, first and second bent thin sections having a radius of curvature and first and second tapered sections interconnecting the thin sections to opposite ends of the thick sections, respectively, wherein the radius of curvature of the bent thick sections in a unrestrained state is smaller than the radius of curvature of the bent thin sections of an unrestrained state.

2. A coil of tapered wire as recited in claim 1, wherein said tapered wire having a successive arrangement of tapered wire segments comprises a quench-hardened and tampered tapered wire.

* * * * *